(12) United States Patent
Haile et al.

(10) Patent No.: US 9,347,493 B2
(45) Date of Patent: May 24, 2016

(54) BEARING ASSEMBLY INCLUDING TAPERED ROLLERS AND SPHERICAL ROLLING ELEMENTS

(71) Applicant: Schaeffler Technologies GmbH & Co. KG, Herzogenaurach (DE)

(72) Inventors: Yohannes Haile, Canton, MI (US); Rohan Dubey, Sterling Heights, MI (US); Zheng Wang, Rochester Hills, MI (US); Shaun Tate, Grand Blanc, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/515,640

(22) Filed: Oct. 16, 2014

(65) Prior Publication Data

US 2015/0110430 A1 Apr. 23, 2015

Related U.S. Application Data

(60) Provisional application No. 61/893,643, filed on Oct. 21, 2013.

(51) Int. Cl.
*F16C 19/49* (2006.01)
*F16C 33/78* (2006.01)
*F16C 33/58* (2006.01)
*F16C 41/00* (2006.01)

(52) U.S. Cl.
CPC ........... *F16C 33/7883* (2013.01); *F16C 19/497* (2013.01); *F16C 41/007* (2013.01); *F16C 33/585* (2013.01); *F16C 33/784* (2013.01)

(58) Field of Classification Search
CPC ...... F16C 19/49; F16C 19/383; F16C 33/585; F16C 33/784; F16C 41/007; F16C 2240/80; G01P 3/42
USPC ......... 384/448, 477, 484, 494, 499, 505, 544, 384/548, 571–572, 506, 513
See application file for complete search history.

(56) References Cited

U.S. PATENT DOCUMENTS

| | | | |
|---|---|---|---|
| 7,748,909 B2 * | 7/2010 | Komori | B60B 27/0005 384/544 |
| 7,950,858 B2 * | 5/2011 | Norimatsu | B60B 27/0084 384/494 |
| 8,360,652 B2 | 1/2013 | Im et al. | |
| 2005/0031240 A1 * | 2/2005 | Dodoro | F16C 19/163 384/494 |
| 2006/0045402 A1 * | 3/2006 | Ebaugh | E21B 4/003 384/494 |

FOREIGN PATENT DOCUMENTS

| | | | | |
|---|---|---|---|---|
| DE | 102008049041 A1 * | 4/2010 | | B60B 27/00 |
| EP | 2303604 B1 | 2/2013 | | |
| JP | 2004019772 A * | 1/2004 | | |

(Continued)

*Primary Examiner* — Marcus Charles
(74) *Attorney, Agent, or Firm* — Volpe and Koenig, P.C.

(57) ABSTRACT

A bearing assembly is provided. The assembly includes a plurality of tapered rollers and a plurality of spherical rolling elements. A first inner ring defines a first inner raceway on which the plurality of tapered rollers run, and a second inner ring defines a second inner raceway on which the plurality of spherical rolling elements run. A unitary outer ring includes a first portion defining a first outer raceway on which the plurality of tapered rollers run, and a second portion defining a second outer raceway on which the plurality of spherical rolling elements run.

4 Claims, 2 Drawing Sheets

(56) References Cited

FOREIGN PATENT DOCUMENTS

| | | | | |
|---|---|---|---|---|
| JP | 2006177447 A | * | 7/2006 | |
| JP | 2007139073 A | * | 6/2007 | |
| JP | 2007192342 A | * | 8/2007 | |
| JP | 2007302202 A | * | 11/2007 | |
| JP | 2007303489 A | * | 11/2007 | |
| JP | 2007303654 A | * | 11/2007 | |
| JP | 2008002607 A | * | 1/2008 | |
| JP | 2008169861 A | * | 7/2008 | |
| JP | 2011085246 A | * | 4/2011 | |
| JP | 2013061042 A | * | 4/2013 | F16C 19/18 |
| WO | WO 2007102270 A1 | * | 9/2007 | B60B 27/0084 |
| WO | 2009062530 A1 | | 5/2009 | |
| WO | 2012069274 A1 | | 5/2012 | |

* cited by examiner

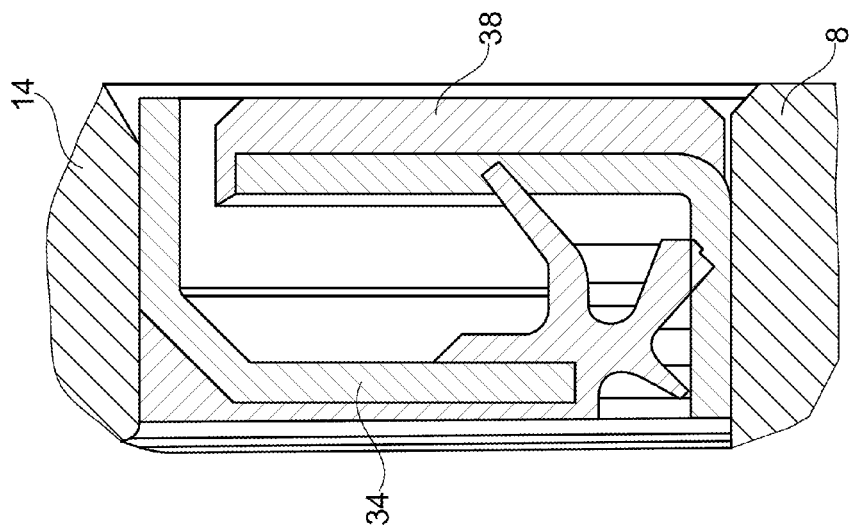
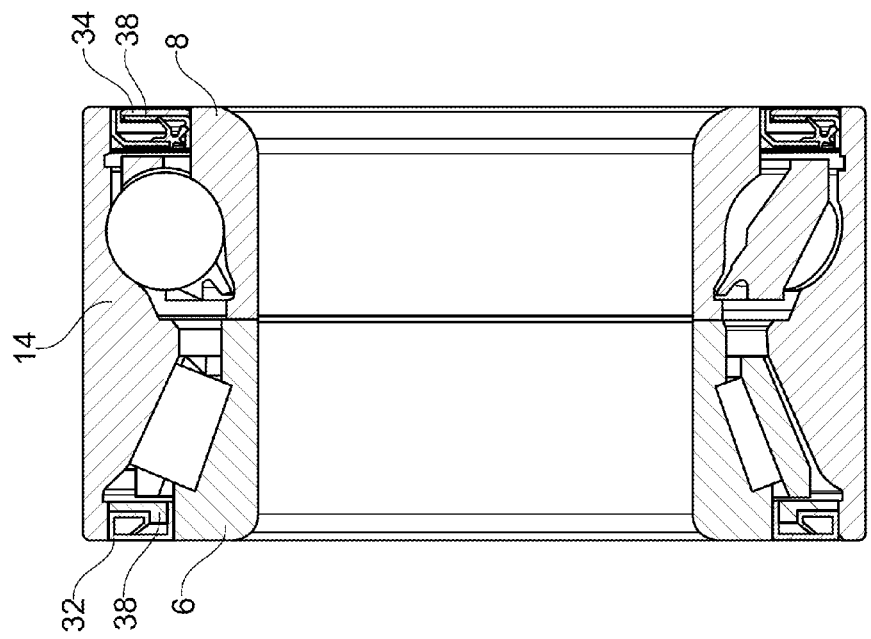

BEARING ASSEMBLY INCLUDING TAPERED ROLLERS AND SPHERICAL ROLLING ELEMENTS

INCORPORATION BY REFERENCE

The following documents are incorporated herein by reference as if fully set forth: U.S. Provisional Application No. 61/893,643, filed Oct. 21, 2013.

FIELD OF INVENTION

This invention is generally related to a bearing assembly and more particularly related to a multiple row bearing assembly.

BACKGROUND

Bearing assemblies are widely used in various mechanical applications, including the automotive field. One type of rolling bearing is a spherical rolling bearing. Spherical rolling bearings are suitable for handling smaller axial and radial loads and are primarily used to reduce frictional loss. Spherical rolling bearings are not suitable for carrying larger loads due to the small contact area between the spherical rolling elements and the rings that support the load.

Another type of bearing uses tapered rollers. Tapered roller bearings are suitable for carrying large axial or radial loads but experience higher frictional losses than other types of bearings. Multiple row bearing assemblies using a number of rows of either spherical rolling elements or tapered rollers are well known for increasing the life and load carrying capacity of bearings. Known multiple row bearing assemblies include split inner and outer rings, which complicates the assembly of the bearing components.

It would be desirable to provide a bearing assembly that provides high axial and radial load bearing capabilities, while still providing for lower frictional losses.

SUMMARY

A bearing assembly is provided. The assembly includes a plurality of tapered rollers and a plurality of spherical rolling elements. A first inner ring defines a first inner raceway on which the plurality of tapered rollers run, and a second inner ring defines a second inner raceway on which the plurality of spherical rolling elements run. A unitary outer ring includes a first portion defining a first outer raceway on which the plurality of tapered rollers run, and a second portion defining a second outer raceway on which the plurality of spherical rolling elements run.

Preferred arrangements with one or more features of the invention are described below and in the claims.

BRIEF DESCRIPTION OF THE DRAWINGS

FIG. 2 is a cross-sectional view of the multiple row bearing assembly including an encoder.

FIG. 3 is an enlarged view of the encoder of FIG. 2.

DETAILED DESCRIPTION OF THE PREFERRED EMBODIMENTS

Figure 1:
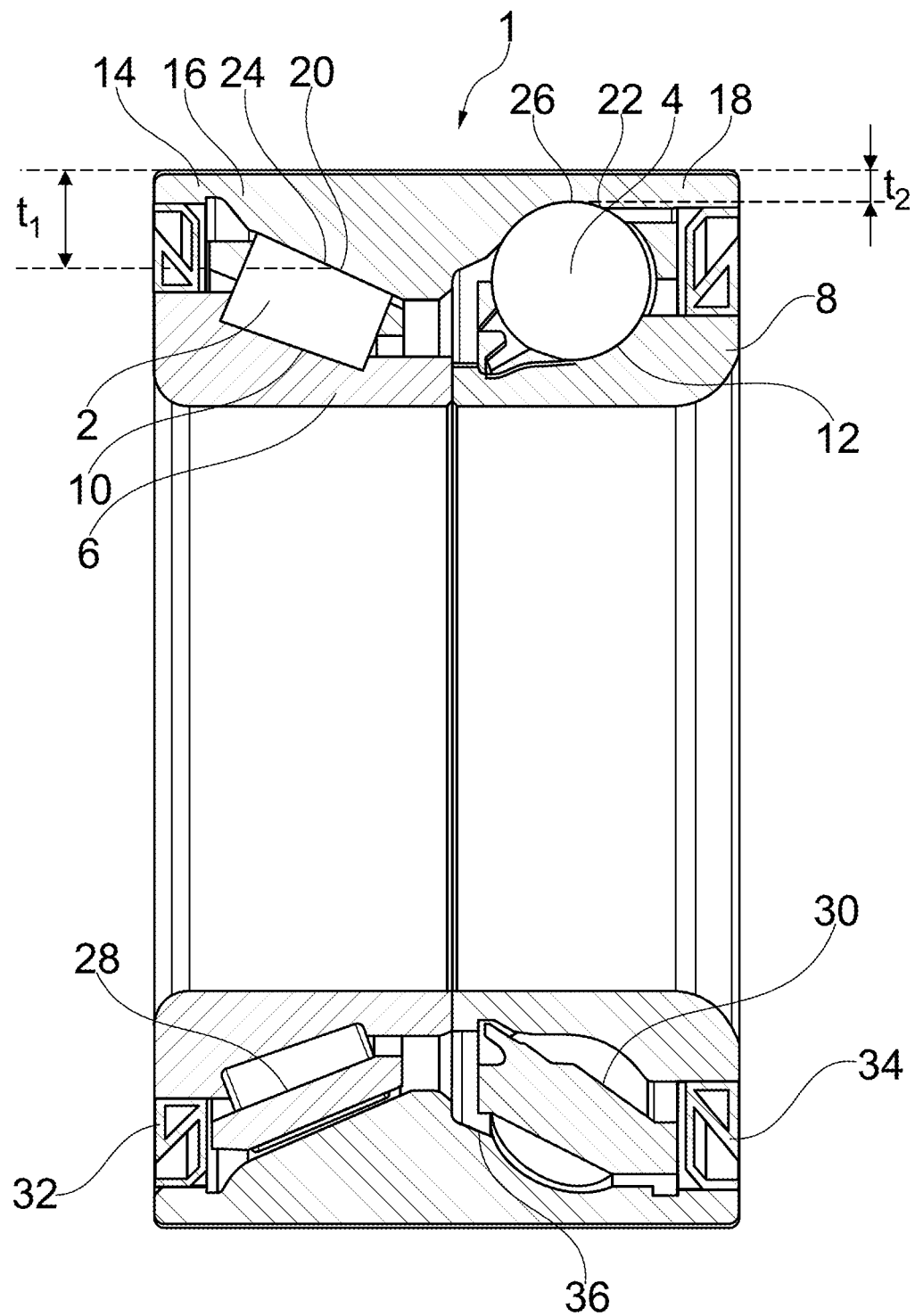
FIG. 1 is a cross-sectional view of a multiple row bearing assembly according to the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivates thereof, and words of similar import.

FIG. 1 shows a preferred embodiment of a multiple row bearing assembly 1 according to the present invention. The multiple row bearing assembly 1 includes a plurality of tapered rollers 2 and a plurality of spherical rolling elements 4. The multiple row bearing assembly 1 preferably includes a split inner ring formed from a first inner ring 6, which defines a first inner raceway 10 on which the plurality of tapered rollers 2 run, and a second inner ring 8, which defines a second inner raceway 12 on which the plurality of spherical rolling elements 4 run. When assembled, axial end faces on the first inner ring 6 and second inner ring 8 abut one another.

The multiple row bearing assembly 1 includes a unitary outer ring 14 with a first portion 16 defining a first outer raceway 20 on which the plurality of tapered rollers 2 run, and a second portion 18 defining a second outer raceway 22 on which the plurality of spherical rolling elements 4 run. The use of a unitary outer ring 14 along with the separate inner rings 6, 8 provides a simplified assembly as compared to known multiple row bearing assemblies. Alternatively, it may be possible to provide the bearing with a split outer ring and a unitary inner ring.

Preferably, a first thickness $t_1$ of the outer ring 14 at a medial portion 24 of the first outer raceway 20 is greater than a second thickness $t_2$ of the outer ring 14 at a medial portion 26 of the second outer raceway 22. The first thickness $t_1$ of the outer ring 14 is preferably at least 1.5 to 2.5 times the second thickness $t_2$ of the outer ring 14. The increased first thickness $t_1$ of the outer ring 14 at the first outer raceway 20 provides the desired load carrying capability for tapered rollers 2. During operation, the tapered rollers 2 will support the majority of the load experience by the bearing assembly 1, while the spherical rolling elements 4 will support some of the load, but are primarily used to reduce frictional losses.

The multiple row bearing assembly 1 can include a first axial end seal 32 extending between the first portion 16 of the outer ring 14 and the first inner ring 6, and a second axial end seal 34 extending between the second portion 18 of the outer ring 14 and the second inner ring 8. The multiple row bearing assembly 1 can include a first cage 28 for supporting the plurality of tapered rollers 2, and a second cage 30 for supporting the plurality of spherical rolling elements 4. A space is defined between the plurality of tapered rollers 2 and the plurality of spherical rolling elements 4. An inner surface of the second portion 18 of the outer ring 14 includes a chamfer 36. The multiple row bearing assembly 1 provides a sealed bearing due to the axial end seals 32, 34. The inclusion of the plurality of spherical rolling elements 4 decreases the frictional losses typically experienced by multiple row bearing assemblies including the tapered rollers 2.

In one embodiment, the multiple row bearing assembly 1 is used in a wheel application. In this embodiment, shown in FIGS. 2 and 3, an encoder 38 can be integrated with at least one of the end seals 32, 34. The encoder 38 detects a speed or position of the first inner ring 6 or the second inner ring 8. When used in connection with a wheel bearing, the encoder 38 can provide information to an anti-lock braking system. In the wheel application, the outer ring 14 includes a flange that attaches the outer ring 14 to a steering knuckle, and the first inner ring 6 or the second inner ring 8 includes a flange that attaches to a brake disc and wheel (not shown).

Having thus described various embodiments of the present bearing assembly in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS

1. Multiple Row Bearing Assembly
2. Plurality of Tapered Rollers
4. Plurality of Spherical Rolling Elements
6. First Inner Ring
8. Second Inner Ring
10. First Inner Raceway
12. Second Inner Raceway
14. Outer Ring
16. First Portion of Outer Ring
18. Second Portion of Outer Ring
20. First Outer Raceway
22. Outer Ring of Tapered Roller Bearing
24. Medial Portion of the First Portion of the Outer Ring
26. Medial Portion of the Second Portion of the Outer Ring
28. First Cage
30. Second Cage
32. First Axial End Seal
34. Second Axial End Seal
36. Chamfer
38. Encoder
$t_1$—Thickness at the Medial Portion of the First Portion of the Outer Ring
$t_2$—Thickness at the Medial Portion of the Second Portion of the Outer Ring

What is claimed is:

1. A bearing assembly comprising:
a plurality of tapered rollers;
a plurality of spherical rolling elements;
a first inner ring having a generally constant first inner diameter and defining a first inner raceway on which the plurality of tapered rollers run,
a second inner ring having a generally constant second inner diameter that is identical to the generally constant first inner diameter of the first inner ring and defining a second inner raceway on which the plurality of spherical rolling elements run; and
a unitary outer ring having a generally constant outer diameter and including a first portion defining a first outer raceway on which the plurality of tapered rollers run, a second portion defining a second outer raceway on which the plurality of spherical rolling elements run, a first thickness of the outer ring at a medial portion of the first outer raceway is greater than a second thickness of the outer ring at a medial portion of the second outer raceway, and the first thickness of the outer ring is at least 1.5 to 2.5 times greater than the second thickness of the outer ring.

2. The bearing assembly of claim 1 further comprising a first axial end seal extending between the first portion of the outer ring and the first inner ring, and a second axial end seal extending between the second portion of the outer ring and the second inner ring.

3. The bearing assembly of claim 2 wherein at least one of the first axial end seal and second axial end seal includes an encoder.

4. The bearing assembly of claim 1 further comprising a first cage for supporting the plurality of tapered rollers, and a second cage for supporting the plurality of spherical rolling elements.

* * * * *